United States Patent [19]

Shinbori et al.

[11] Patent Number: 4,720,085
[45] Date of Patent: Jan. 19, 1988

[54] VEHICLE SUSPENSION APPARATUS

[75] Inventors: Takeyoshi Shinbori, Yokosuka; Takeo Fukumura; Yoshio Kimura, both of Yokohama, all of Japan

[73] Assignee: NHK Spring Co., Ltd., Yokohama, Japan

[21] Appl. No.: 904,782

[22] Filed: Sep. 4, 1986

Related U.S. Application Data

[63] Continuation of Ser. No. 651,433, Sep. 17, 1984, abandoned.

[30] Foreign Application Priority Data

| Sep. 26, 1983 | [JP] | Japan | 58-176401 |
| Feb. 28, 1984 | [JP] | Japan | 59-36725 |
| Mar. 31, 1984 | [JP] | Japan | 59-64481 |
| Mar. 31, 1984 | [JP] | Japan | 59-64482 |
| Jun. 30, 1984 | [JP] | Japan | 59-136308 |
| Aug. 9, 1984 | [JP] | Japan | 59-166945 |

[51] Int. Cl.$^4$ .................. B60G 17/00; B60G 11/26; F16F 5/00; F16F 9/46
[52] U.S. Cl. .................. 267/64.16; 188/299; 267/64.26; 280/707
[58] Field of Search ............... 188/266, 279, 282, 299, 188/311, 314, 322.15, 322.21, 319, 315, 269; 280/707, 708, 703, 714, 6.1; 267/64.12, 64.13, 64.15, 64.16, 64.17, 64.28, 64.25, 64.26, 35

[56] References Cited

U.S. PATENT DOCUMENTS

| 3,246,905 | 4/1966 | Morgan | 188/299 X |
| 3,548,977 | 12/1970 | Morgan | 188/279 |
| 4,334,600 | 6/1982 | Palitto | 188/314 |
| 4,468,739 | 8/1984 | Woods et al. | 280/707 X |
| 4,515,253 | 5/1985 | Itoh | 188/314 |
| 4,546,960 | 10/1985 | Abrams et al. | 280/707 X |
| 4,555,126 | 11/1985 | Ishimitsu et al. | 280/707 |

FOREIGN PATENT DOCUMENTS

| 0226525 | 1/1960 | Australia . |
| 0467107 | 11/1975 | Australia . |
| 0472889 | 5/1976 | Australia . |
| 0508336 | 11/1976 | Australia . |
| 0513256 | 6/1977 | Australia . |
| 73777/81 | 3/1982 | Australia . |
| A1106697 | 4/1984 | European Pat. Off. . |
| 2362017 | 3/1978 | France . |
| 0505448 | 3/1975 | Japan . |
| 50-29114 | 9/1975 | Japan . |
| 0065741 | 5/1980 | Japan . |
| 56-131409 | 10/1981 | Japan . |
| 58-142047 | 8/1983 | Japan . |
| 59-118512 | 7/1984 | Japan . |
| 59-117933 | 7/1984 | Japan . |
| 1176627 | 1/1970 | United Kingdom . |
| 1311646 | 3/1973 | United Kingdom . |
| 1500714 | 2/1978 | United Kingdom . |
| A2135020 | 8/1984 | United Kingdom . |
| A2134625 | 8/1984 | United Kingdom . |

Primary Examiner—Andres Kashnikow
Assistant Examiner—Robert J. Oberleitner
Attorney, Agent, or Firm—Frishauf, Holtz, Goodman & Woodward

[57] ABSTRACT

A vehicle suspension apparatus comprising a body with an internal space and capable of contraction and expansion within which a gas chamber and an oil chamber are formed, an auxiliary container having therein a gas chamber, a channel with a valve connecting the gas chamber in the body and gas chamber defined in the auxiliary container, and a restriction member mounted in the oil chamber having a contrable orifice which allow passage for the working oil occupied with the orifice therebetween.

6 Claims, 14 Drawing Figures

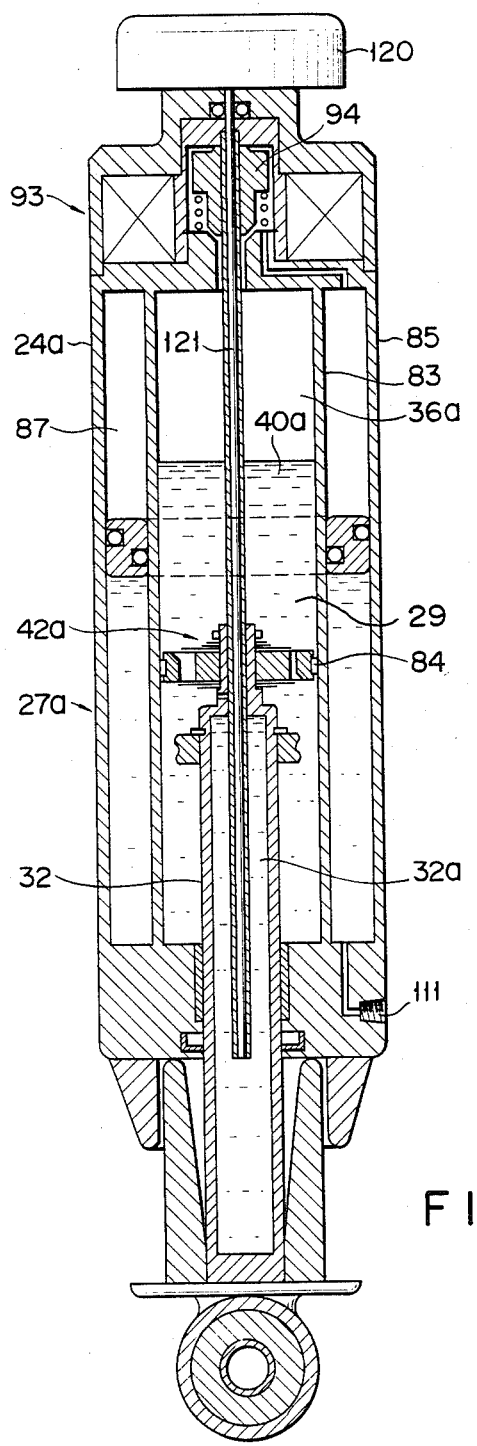
FIG. 5
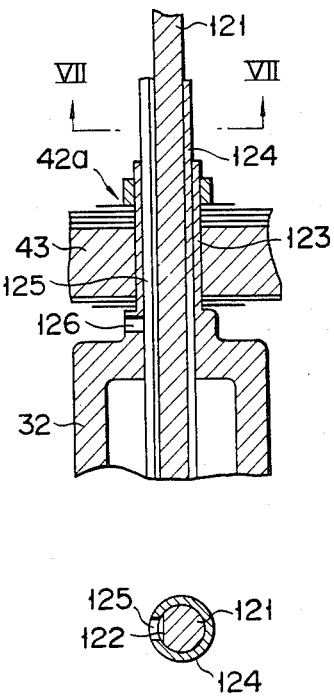
FIG. 6
FIG. 7

4,720,085

VEHICLE SUSPENSION APPARATUS

This application is a continuation of application Ser. No. 651,433 filed Sep. 17, 1984, now abandoned.

BACKGROUND OF THE INVENTION

The present invention relates to a vehicle suspension apparatus having a contraction/expansion body including a cylinder and a hollow rod telescopically coupled to the cylinder in a substantially coaxial relation so as to reciprocate therewith and formed therein an internal space of variable volume, the internal space being separated into a gas chamber filled with a gas and an oil chamber filled with a working oil; a restriction member arranged in the oil chamber to be substantially perpendicular to an axis of the construction/expansion body and having an orifice to allow passage for the working oil occupied with the orifice therebetween; an auxiliary container for containing a gas therein; and a channel for coupling through a valve the gas chamber of the internal space of the rod and a gas chamber of the auxiliary container.

Most conventional vehicle suspension apparatuses use metallic springs such as coil or leaf springs. However, vehicle suspension apparatuses using hydropneumatic actuators in place of the metallic springs have become prevalent recently. In such a suspension apparatus using a hydropneumatic actuator, the buffer function, obtained by the resiliency of the gas, and the damping force, obtained by flow resistance upon the flow of working oil through an orifice, are used to provide the damping effect and the braking force of the suspension apparatus. However, in a hydropneumatic actuator of this type, a spring constant is determined depending upon the pressure of the sealed gas and the volume of the gas chamber. Therefore, unless the gas pressure or volume is changed properly, optimal damping characteristics cannot be obtained in accordance with various travel conditions of a vehicle.

In order to solve this problem, it has been proposed to use an auxiliary container with an inner gas chamber in addition to a conventional hydropneumatic actuator and to communicate the two gas chambers with each other by means of a valve, thereby changing an effective volume serving as a gas chamber and changing the spring constant of the suspension apparatus using the gas pressure.

However, as a result of studies made, it has been found out that the function of a vehicle suspension apparatus can be improved by changing the damping force of an orifice in accordance with the travel condition in addition to changing the spring constant of the apparatus.

SUMMARY OF THE INVENTION

It is an object of the present invention to provide a vehicle suspension apparatus in which a damping force of the apparatus, as well as a spring constant, can be changed.

In order to achieve the above object, in a vehicle suspension apparatus of the present invention, there is provided a means for controlling an area of an orifice arranged in the restriction member.

In the apparatus having the above-mentioned structure according to the present invention, when the valve is opened to increase the opening of the orifice by the orifice control means, a plurality of gas chambers are communicated with each other through the valve. Then, the effective gas chamber area is increased, and the spring constant is decreased. At the same time, the flow resistance through the orifice is decreased, as is the damping force for regulating the longitudinal contraction/expansion of the overall suspension apparatus. Therefore, a comfortable drive is assured during straight travel on a smooth road. However, when the valve is closed and the opening of the orifice is narrowed by the orifice control means, the effective gas volume is decreased. In addition, the spring constant is increased, and the damping force is increased. In this manner, a stable operation can be obtained when making a turn or travelling on a rough road.

The valve and the orifice control means can be automatically controlled in accordance with signals obtained from sensors for detecting various conditions such as vehicle speed, turn angle, and/or road condition. Alternatively, the valve and the orifice control means can be controlled manually.

Various structures are plausible for a vehicle suspension apparatus of the type described above. Examples of various structures may include a switching system for the valve for changing an arrangement of the cylinder, the hollow rod and the auxiliary container for changing the spring constant; a switching system for switching the effective sectional area of the orifice so as to change the flow resistance; or a system for connecting the two gas chambers. A typical example of a vehicle suspension apparatus realized in consideration of these factors will be described below with reference to embodiments of the present invention.

BRIEF DESRCIPTION OF THE DRAWINGSS

FIG. 5 is a sectional view of a third embodiment of a vehicle suspension apparatus of the present invention;

FIG. 6 is an enlarged sectional view showing the main part of a restriction member of the embodiment shown in FIG. 5;

FIG. 7 is a sectional view along the line VII—VII in FIG. 6;

DETAILED DESCRIPTION OF THE PREFERRED EMBODIMENTS

Figure 1:
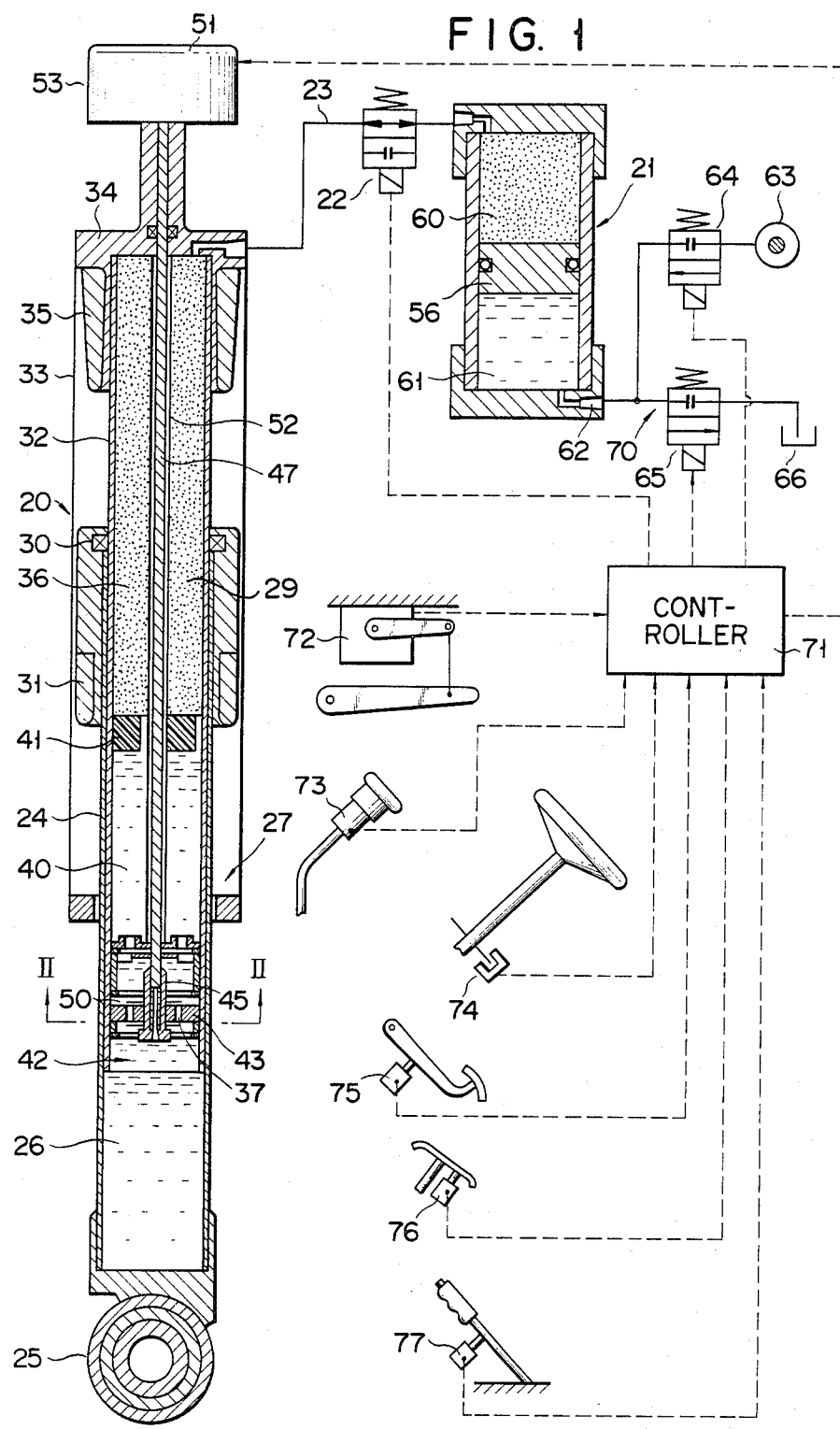
FIG. 1 is a sectional view of a first embodiment of a vehicle suspension apparatus of the present invention.

FIG. 1 shows a first embodiment of a vehicle suspension apparatus in which an actuator 20 and an auxiliary container 21 of the structures described below are arranged separately and are coupled through control piping 23 having a valve 22 therein.

A cylinder 24 of the actuator 20 opens at the top as shown in FIG. 1 and is mounted at its lower closed end to a mounting member 25 which is, in turn, mounted on a member at the side of an axle (not shown). An oil chamber 26 for holding a working oil therein is defined at the lower, inner side of the cylinder 24. An oil seal 30 and a rebound stopper 31 of an elastic material such as rubber are fitted around the upper end of the cylinder 24. A hollow rod 32 is axially and slidably inserted in the cylinder 24 to be coaxial therewith so as to provide a contraction/expansion body 27 which telescopes and defines therein an internal space 29 of variable volume at it changes its overall length. The rod 32 is open at its lower end, is surrounded by a protection cover 33, and is closed with a cover 34 at its upper end. A damper member 35 of an elastic material such as rubber extends downward from the lower surface of the cover 34 so as to surround the rod 32. A gas chamber 36 for holding high-pressure or compressed gas such as nitrogen is formed at the upper, inner side of the rod 32. The oil chamber 40 for holding working oil is arranged below the gas chamber 36. A free piston 41 is interposed between the chambers 36 and 40.

Figure 2:
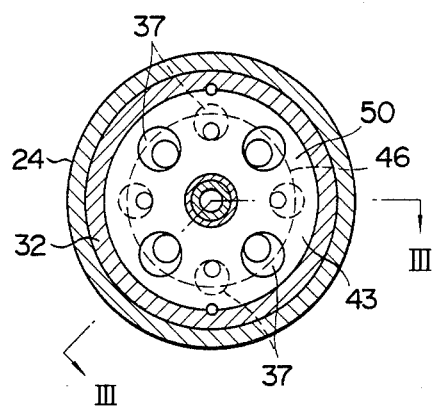
FIG. 2 is a sectional view of the embodiment shown in FIG. 1 along the line II—II therein.
Figure 3:
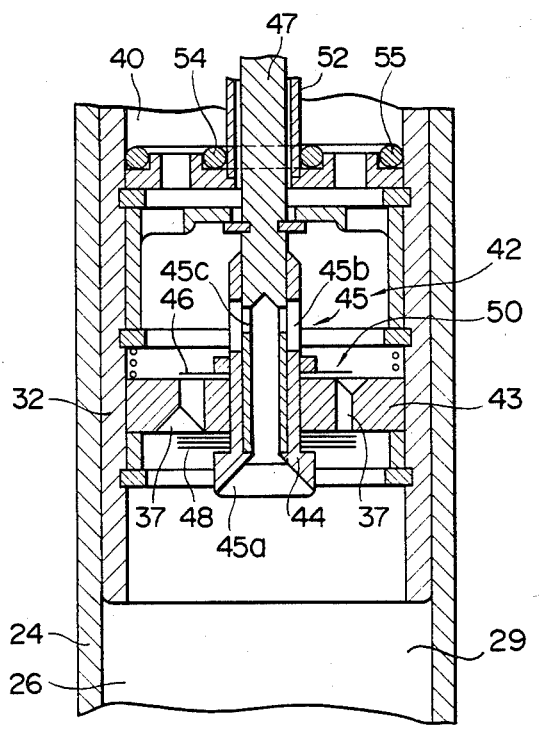
FIG. 3 is a sectional view of the embodiment shown in FIG. 2 along the line III—III therein.

A restriction member 42 is mounted within the oil chamber 40 of the rod 32, which communicates with the oil chamber 26 in the cylinder 24 through a plurality of orifices 37 and a first orifice 45 in the restriction member 42. As shown in FIGS. 2 and 3, a main body 43 of the restriction member 42 is mounted on the rod 32. The plurality of orifices 37 consisting of a communication hole tapered to be narrowed downward and another communication hole tapered to be narrowed upward are formed in the restriction member main body 43. An operation shaft 47 extends downward from a rotating means 51 of an orifice control mechanism 53 to be coaxial with the rod 32. A cylindrical member 44 is fitted around the operation shaft 47. The cylindrical member 44 coaxially passes inside the restriction member main body 43, projects downward, and has a bulged portion at its lower end. The operation shaft 47 has an axial hole 45a formed to extend by a predetermined length from the lower end thereof. The upper end of the axial hole 45a can communicate with the exterior of the cylindrical member 44 through a through hole 45c formed in the radial direction of the operation shaft 47 and a through 45b formed in the radial direction of the cylindrical member 44, as shown in FIG. 3. When the operation shaft 47 is driven by the rotating means 51 and is rotated through about 90 degrees, the through hole 45b is substantially perpendicular to the through hole 45c. Then, the working oil below the axial hole 45a is shielded from both sides of the through hole 45c along the axial direction. In this manner, the first orifice 45, which is adjustable to be opened or closed, is formed by the through holes 45b and 45c.

Valve seats 46 and 48 are mounted on and below the restriction member main body 43. The valve seats 46 and 48 constitute a second orifice 50 together with the orifices 37. Referring to FIG. 3, when the rod 32 is moved upward relative to the cylinder 24 and the working oil flows downward relative to the restriction member 42, the valve seat 46 is pressed against the restriction member main body 43, while the valve seat 48 is deflected in a direction to be separated from the restriction member main body 43. Therefore, the orifices 37 operate in accordance with the positional relationship between the valve seats 46 and 48 so as to determine the flow rate of the working oil through the orifices 37. When the restriction member 42 is moved downward, the orifices 37 provide a similar restriction effect. In this manner, the restriction member 42 consists of the first and second orifices 45 and 50. The first orifice 45 can be opened or closed by the rotating means 51. Although the second orifice 50 cannot be externally adjusted, it can provide various restriction effects in accordance with the flow rate or flow direction of the working oil. Since the portion of the restriction member 42 constituting the second orifice 50 comprising a plate valve is a known structure, it will not be described in further detail.

As can be seen from FIG. 3, parallel channels are formed in the second and first orifices 50 and 45. Both of these orifices together generate a damping force for damping the relative movement between the cylinder 24 and the rod 32.

The operation shaft 47 extends along the axial direction of the rod 32 from the restriction member 42 through the free piston 41 and is coupled to the rotating means 51 such as a normal motor or torque motor through the cover 34. When the drive power of the rotating means 51 is stopped, the first orifice 45 is opened/closed. A pipe 52 is formed to surround the operation shaft 47 and is integral with the rod 32. The operation shaft 47 is capable of rotating in the pipe 52. The pipe 52 serves to shield the outer surface of the operation shaft 47 from the gas inside the gas chamber 36. The operation shaft 47 and the rotating means 51 constitute an orifice control mechanism 53.

When the free piston 41 is moved to its lowermost position, sealing washers 54 and 55 shown in FIG. 3 are brought into contact with the lower surface of the free piston 41 so as to prevent leakage of the gas from the gas chamber 36. In this state, the gas chamber 36 has a maximum volume.

The auxiliary container 21 is divided into an upper gas chamber 60 and a lower oil chamber 61 by an internal free piston 56. A high-pressure gas such as nitrogen is sealed in the gas chamber 60. The gas chamber 60 and the gas chamber 36 of the actuator 20 are coupled through the control piping 23 having the valve 22. A connection port 62 is formed at a lower portion of the hydraulic chamber 61 of the auxiliary container 21. A hydraulic oil unit 70 is connected to the port 62 and has a hydraulic pump 63, a directional control valve 64 for supplying the working oil, a directional control valve 65 for discharging the working oil, and a tank 66 for holding the working oil.

The valve 22, the directional control valves 64 and 65, and the rotating means 51 are controlled through a controller 71 using a computer. The controller 71 receives detection signals from a vehicle height sensor 72, a vehicle speed sensor 73, a steering wheel sensor 74, a brake sensor 75, an acceleration sensor 76, and a side brake sensor 77. Based on the signals received from these sensors, the controller 71 supplies output signals to the rotating means 51 and the valve 22 for achieving a comfortable and safe drive of the vehicle. When the vehicle suspension apparatus of the above embodiment is used, if the vehicle travels straight on a smooth road, the valve 22 is opened to communicate the gas chamber 36 of the rod 32 with the gas chamber 60 of the auxiliary container 21. Then, the spring constant of the apparatus is decreased. At the same time, the first orifice 45 is opened, and the damping force for damping the movement of the rod 32 relative to the cylindrical member 44 is decreased. Thus, a comfortable drive can be assured.

When the steering wheel is operated in cases such as a turn or a lane change, if a steering wheel operation angle signal from the steering wheel sensor 74 and a travel speed signal and the like from the vehicle speed sensor 73 are detected to exceed predetermined reference values by the controller 71, the controller 71 produces an instruction signal. Upon generation of this instruction signal, the valve 22 is closed to reduce the effective gas chamber volume down to that of the gas chamber 36 in the rod 32, and the spring constant is increased. At the same time, the rotating means 51 is driven to close the first orifice 45 to increase the above-mentioned damping force. Therefore, the vehicle posture is stabilized, and a stable operation of the vehicle can be assured.

When an abrupt acceleration or deceleration of the vehicle is detected by the acceleration sensor 76 or the brake sensor 75, the controller 71 produces a control signal, as in the case of the steering wheel operation, so as to close the valve 22 and the first orifice 45. Then, the spring constant is increased, and the damping force is increased. Thus, pitching motion of the vehicle is prevented. When it is preferred that only one of the valve 22 and the first orifice 45 be operated, a corresponding program can be stored in the controller 71 to allow corresponding control.

As has been described earlier, the major objective of the present invention is to change the spring constant and the damping force of a vehicle suspension apparatus so as to allow a safe and comfortable drive. However, the vehicle height can also be changed with the same suspension apparatus by using a hydraulic oil unit 70, as shown in FIG. 1. More specifically, when a vehicle height setting instruction is supplied to the controller 71 by operating a switch (not shown), the directional control valves 64 and 65 are automatically operated to eliminate the difference between the preset vehicle height and the actual vehicle height detected by the vehicle height sensor 72. Working oil is charged into or discharged from the oil chamber 61 to adjust the gas pressure acting on the gas chambers 60 and 36. When the rod 32 is vertically moved and the preset vehicle height is achieved, the drive operation of the directional control valves 64 and 65 is stopped. However, this vehicle height adjustment is not performed while the valve 22 is closed.

When a maximum vehicle height instruction is supplied as in the case of tire exchange, only when operation of the side brake is detected by the side brake sensor 77, is the directional control valve 64 opened. The working oil is then supplied to the oil chamber 61, and a maximum vehicle height is obtained.

The controller 71 can be programed to decrease the vehicle height to assure a safe drive at high speed when the vehicle speed sensor 73 detects a vehicle speed higher than the preset vehicle speed.

The vehicle height adjustment operation in accordance with the signal from the vehicle height sensor 72 can be delayed by a predetermined period of time so that adjustment will not be made upon detecting only small bumps in the road. The controller 71 can further be programed to determine travel on a rough road and to increase the damping force and/or automatically increase the vehicle height when changes in the vehicle height are continuously detected within a short period of time.

In addition to these control operations, vehicle height adjustment, switching of the spring constant, and adjustment of the damping force can be achieved semiautomatically, automatically or manually in accordance with the road conditions, vehicle conditions, and travel conditions. In this manner, improvements in riding comfort and operability as well as multifunctions can be provided.

In the embodiment shown in FIG. 1, the gas chamber 60 and the oil chamber 61 are formed in the auxiliary container 21, and the free piston 56 is arranged between these chambers 60 and 61. This structure is adopted so as to connect the hydraulic oil unit 70 to the oil chamber 61 so as to adjust the vehicle height. In a suspension apparatus which does not need vehicle height adjustment, the interior of the auxiliary container 21 can be used only as a gas chamber, and the free piston 56 and the oil chamber 61 can be omitted. In FIG. 1, dotted lines indicate transmission lines for signals supplied to the controller 71 from the sensors, and the signals supplied from the controller 71 to the rotating means 51, the valve 22, and the directional control valves 64 and 65.

Figure 4:
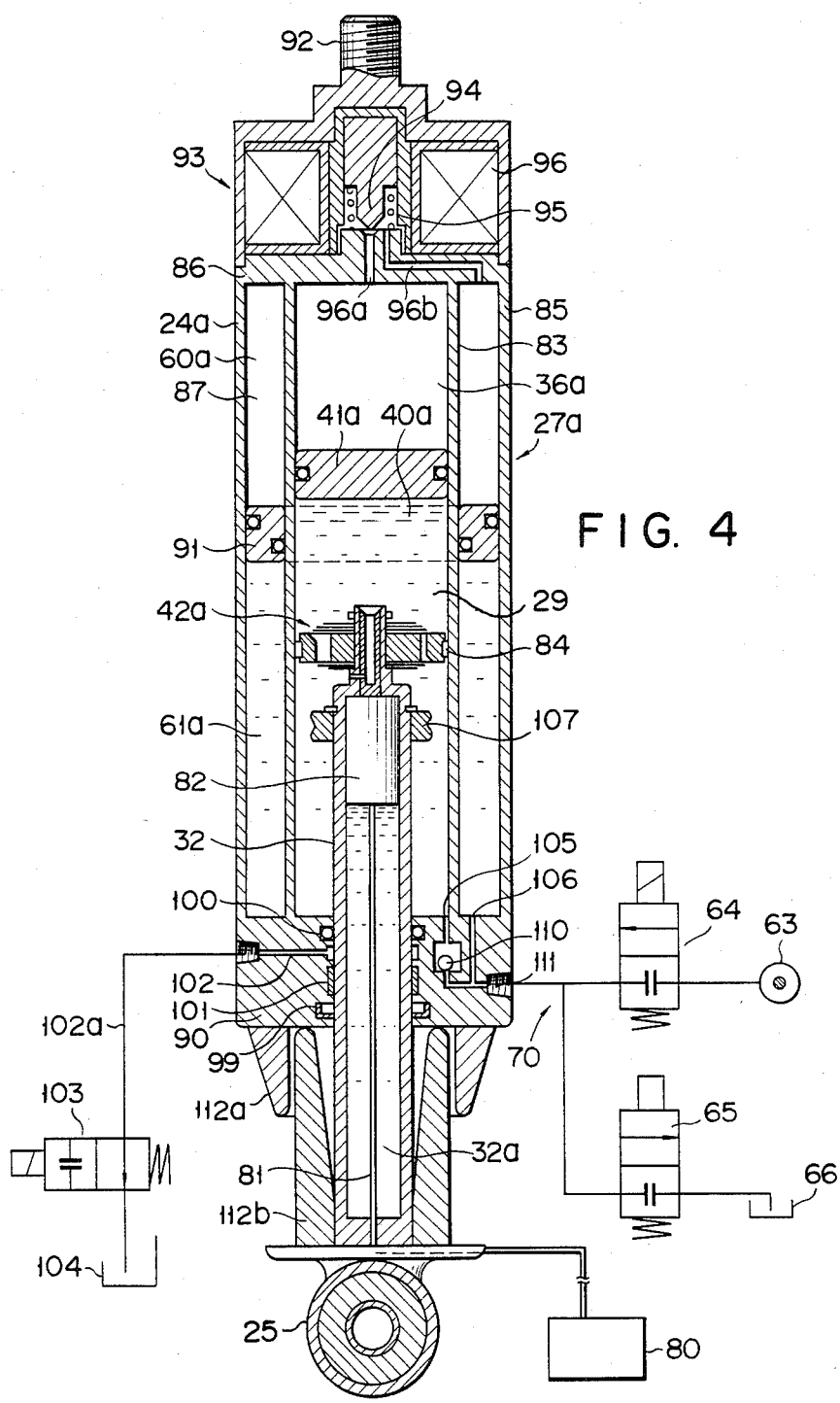
FIG. 4 is a sectional view of a second embodiment of a vehicle suspension apparatus of the present invention.

FIG. 4 shows the second embodiment of the present invention. The most significant difference between the first and second embodiments resides in that the actuator and the auxiliary container, which are separate from each other and coupled through the control piping 23 in the embodiment shown in FIG. 1, are formed integrally in the embodiment shown in FIG. 4, such that the auxiliary container surrounds the actuator and the control piping 23 is formed in the integral assembly.

As shown in FIG. 4, a hollow rod 32 is mounted to stand upright on a mounting member 25 at the vehicle side. A motor 82 connected to a motor controller 80 through a wire 81 is mounted in the hollow rod 32. A working oil for cooling the motor 82 is filled in a remaining space 32a inside the hollow rod 32. A rotating shaft of the motor 82 extends from the upper part of the hollow rod 32 and receives therearound a restriction member 42a similar to the restriction member in FIG. 3. As may be seen from a comparison between FIGS. 3 and 4, the restriction member 42a is mounted on the rotating shaft of the motor 82 such that it is vertically inverted with respect to FIG. 3. Since the outer circumferential surface of the restriction member 42a shown in FIG. 4 axially slides with respect to the inner circumferential surface of an inner cylinder 83, to be described later, a ring-like bearing 84 is mounted around the restriction member 42a. The bearing 84 is made of a material which has a high resistance to wear and is subject to almost no deterioration upon contact with the working oil.

A cylinder 24a having a double-pipe structure of the inner cylinder 83 and an outer cylinder 85 surrounds the rod 32 coaxially with the rod 32. The cylinder 24a and the rod 32 together constitute a contraction/expansion body 27a which contracts or expands telescopically. The cylinder 24a has an upper wall 86 at its upper portion and a lower wall 90 at its lower portion. The resriction member 42a is in contact with the inner circumferential surface of the inner cylinder 83 through the ring-like bearing 84 so as to be axially movable, as has been described above. The interior of the cylinder 83 is divided into a gas chamber 36a and an oil chamber 40a. The gas chamber 36a is formed at an upper portion of the cylinder 83 and holds a gas introduced therein. The oil chamber 40a holds the working oil, so that the surface level of the working oil is above the level of the restriction member 42a at any position of the cylinder 24a relative to the rod 32. A free piston 41a is arranged between the chambers 36a and 40a.

An annular space 87, elongated along the axial direction, is formed between the inner cylinder 83 and the outer cylinder 85. An upper gas chamber 60a and a lower oil chamber 61a are formed with a free piston 91 interposed therebetween.

A mounting portion 92 for the vehicle is mounted on the upper wall 86, and a solenoid controlled valve 93 is interposed between the upper wall 86 and the mounting portion 92. The solenoid controlled valve 93 has an armature 94 forming a poppet, a spring 95 biasing the armature 94 upward, and a solenoid 96 for driving the armature 94 downward. The lower portion of the armature 94 is formed to have a small diameter, and its top portion is conical in shape. A conical recess is formed in the upper wall 86 so as to engage with the conical top portion of the armature 94. A channel 96a and a gas channel 96b are formed in the upper wall 86. The channel 96a communicates the gas chamber 36a in the inner cylinder 83 with the space formed around the small-diameter portion of the armature 94. The gas channel 96b communicates the space around the small-diameter portion with the annular space 87.

Two sealing members 100 and 99 are mounted at a predetermined distance from each other between the lower wall 90 of the cylinder 24a and the rod 32 extending through the lower wall 90. A bearing member for rod 32 made of, for example, polytetrafluorethylene is arranged on an upper side of the sealing member 99. Of the two sealing members 100 and 99, the upper sealing member 100 is formed to allow slight leakage of the working oil positioned in the lower end portion of the oil chamber 40a. The working oil leaked through the sealing member 100 is recovered in a tank 104 through a drain channel 102 interposed between the sealing members 100 and 99, an outer piping 102a, and a valve 103. The drain channel 102 serves to prevent degradation of the sealing member 99 due to high pressure inside the oil chamber 40a. More specifically, the drain channel 102 weakens the sealing function of the sealing member 99 to discharge the working oil leaked through the sealing member 100 so as to decrease the pressure of the working oil applied on the lower sealing member 99, thereby preventing degradation of the sealing member 99.

As shown at the right side of FIG. 4, the lower wall 90 has channels 105 and 106. The channel 105 communicates a port 111 opening to the outside of the lower wall 90 with the oil chamber 40a, and has a check valve 110. The channel 106 communicates the port 111 with the oil chamber 61a.

When the height of a vehicle mounting the above-mentioned suspension apparatus is to be adjusted, the hydraulic oil unit 70 (not shown) described with reference to FIG. 1 is connected to the port 111 so as to increase/decrease the amount of working oil in the inner cylinder 83 and the annular space 87. In this case, the channel 105 can be used to replenish, via the port 111, working oil leaked through the drain channel 102.

A rebound rubber stopper 107 mounted around the rod 32 is used to define the uppermost position of the cylinder 24a when the cylinder 24a is moved upward relative to the rod 32. A rubber bumper 112a projecting downward from the lower wall 90 and a rubber bumper 112b projecting upward from the mounting member 25 define the lower limit of the cylinder 24a when the cylinder 24a is moved downward relative to the mounting member 25.

In the suspension apparatus of this embodiment, the cylinder and the auxiliary container are rendered compact in size by using a double-structure cylinder 24a, and no external piping for communicating the two chambers, as in the embodiment shown in FIG. 1, is necessary. Therefore, the problem of gas leakage from the piping is reduced significantly, and the overall apparatus can be rendered small. Furthermore, since the long piping as shown in FIG. 1 is not required, even if a vibration acting on the two ends of the suspension apparatus has a relatively high frequency, the connected gas chambers function well to assure excellent driving comfort of the vehicle.

Updating of the spring constant and the damping force of the apparatus in accordance with the drive conditions can be automatically performed, as in the case of the apparatus shown in FIG. 1, using many sensors and a controller 71 which supplies proper control signals to a motor 82 and the solenoid controlled valve 93 based on output signals from these sensors. However, since the construction and wiring of the apparatus are the same as described with reference to the embodiment shown in FIG. 1, the illustration and description thereof will be omitted.

A third embodiment shown in FIG. 5 is substantially the same as the embodiment shown in FIG. 4. In the embodiment shown in FIG. 4, the restriction member 42 is driven from below by the motor 82 mounted inside the rod 32. However, in the embodiment shown in FIG. 5, a restriction member 42a is driven from above by a drive mechanism 120 such as a motor or a solenoid operated valve mounted above a solenoid controlled valve 93.

A drive shaft 121 shown in FIG. 6 extends downward from the drive mechanism 120 and reaches into the working oil in the rod 32 through the restriction member 42a and is driven through a predetermined angle by the drive mechanism 120. A flat portion 122 is formed on the surface of the drive shaft 121 to extend along its longitudinal direction, as shown in FIG. 7. A guide tube 124, as shown in FIG. 6, is fitted in a cylindrical portion 123 supporting the restriction member 42a at the upper portion of the rod 32. The drive shaft 121 is inserted inside the guide tube 124. A groove 125 is formed in the guide tube 124 to extend along its axial direction. A through hole 126 is formed through the restriction member 42a in the radial direction to reach the groove 125. When the drive shaft 121 is brought to the position shown in FIGS. 6 and 7 with respect to the guide tube 124 and the through hole 126 by means of the drive mechanism 120, the working oil portion above the restriction member 42a is passed through the gap between the flat portion 122 of the drive shaft 121 and the inner circumferential surface of the guide tube 124 and through the groove 125 and communicates with the working oil below the restriction member 42a through the through hole 126. In other words, the orifice formed by the restriction member 42a is a total of the first and second orifices 45 and 50 described with reference to FIG. 3, and the flow resistance is decreased. However, when the drive shaft 121 is driven by the drive mechanism 120 and the channel defined between the flat portion 122 of the drive shaft 121, and the guide tube 124 is shielded from the groove 125 and the through hole 126, the effective orifice of the restriction member 42a becomes only the second orifice 50 described with reference to the first embodiment shown in FIG. 3. Then, the flow resistance of the restriction member 42 is increased. Many parts shown in FIG. 4 such as the hydraulic oil unit for vehicle height adjustment, the controller 71 and associated sensors, and the structure or members for the drain channel 102 are omitted in FIG. 5 for the sake of simplicity. In this embodiment, the drive mechanism 120 is arranged at a position where it is easily accessible from the outside and where it is not immersed in the working oil. Therefore, assembly and handling as well as maintenance and checking are very easy. In the embodiment shown in FIG. 5, the drain channel 102 (FIG. 4) is not arranged, and the hydraulic oil unit 70 (FIG. 1) is not connected. Therefore, the port 111 is closed by a suitable member.

Figures 8, 9:
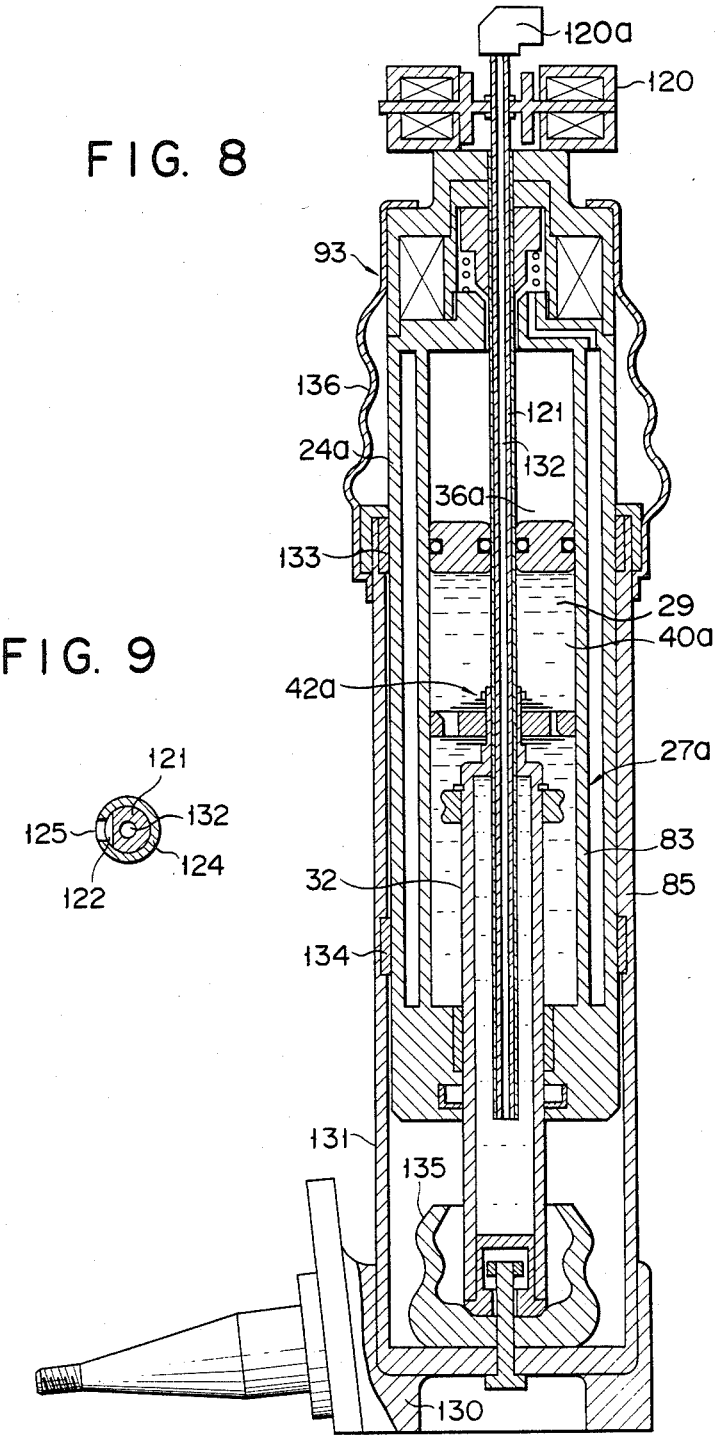
FIG. 8 is a sectional view of a fourth embodiment of a vehicle suspension apparatus of the present nvention.
FIG. 9 is a cross-sectional view of a drive shaft shown in FIG. 8.

FIG. 8 shows an embodiment very similar to the embodiment shown in FIG. 5. The embodiment shown in FIG. 8 is different from that shown in FIG. 5 in that, in the embodiment shown in FIG. 8, a cylinder 24a is mounted on a support cylinder 131, mounted on a mounting member 130, at the vehicle side so as to be rotatable and axially movable, and communication between a hydraulic oil unit 70 for adjusting the vehicle height and a hydraulic chamber 40a inside an inner cylinder 83 is achieved via a through hole 132 formed in the centers of the output shaft of a drive mechanism 120 and a drive shaft 121 coupled thereto as shown in FIG. 8. Working oil is supplied through an elbow 120a at the upper portion of the drive mechanism 120. In this structure, external piping for changing the effective volume of the gas chamber is arranged at the side of the vehicle and can therefore be short and resistant to vibrations. Reference numerals 133 and 134 are bearings interposed between the cylinder 24a and the support cylinder 131. The cup-like member mounted at the lower end portion of the support cylinder 131 is a rubber bumper 135 which defines the lowermost position of the support cylinder 131. The bellows-like member covering the upper end of the support cylinder 131 and the outer surface of a solenoid operated valve 93 is a dust cover 136.

FIG. 9 is a view of the embodiment shown in FIG. 8, which corresponds to FIG. 7. FIG. 9 clearly illustrates the through hole 132 formed in the drive shaft 121.

Figure 10:
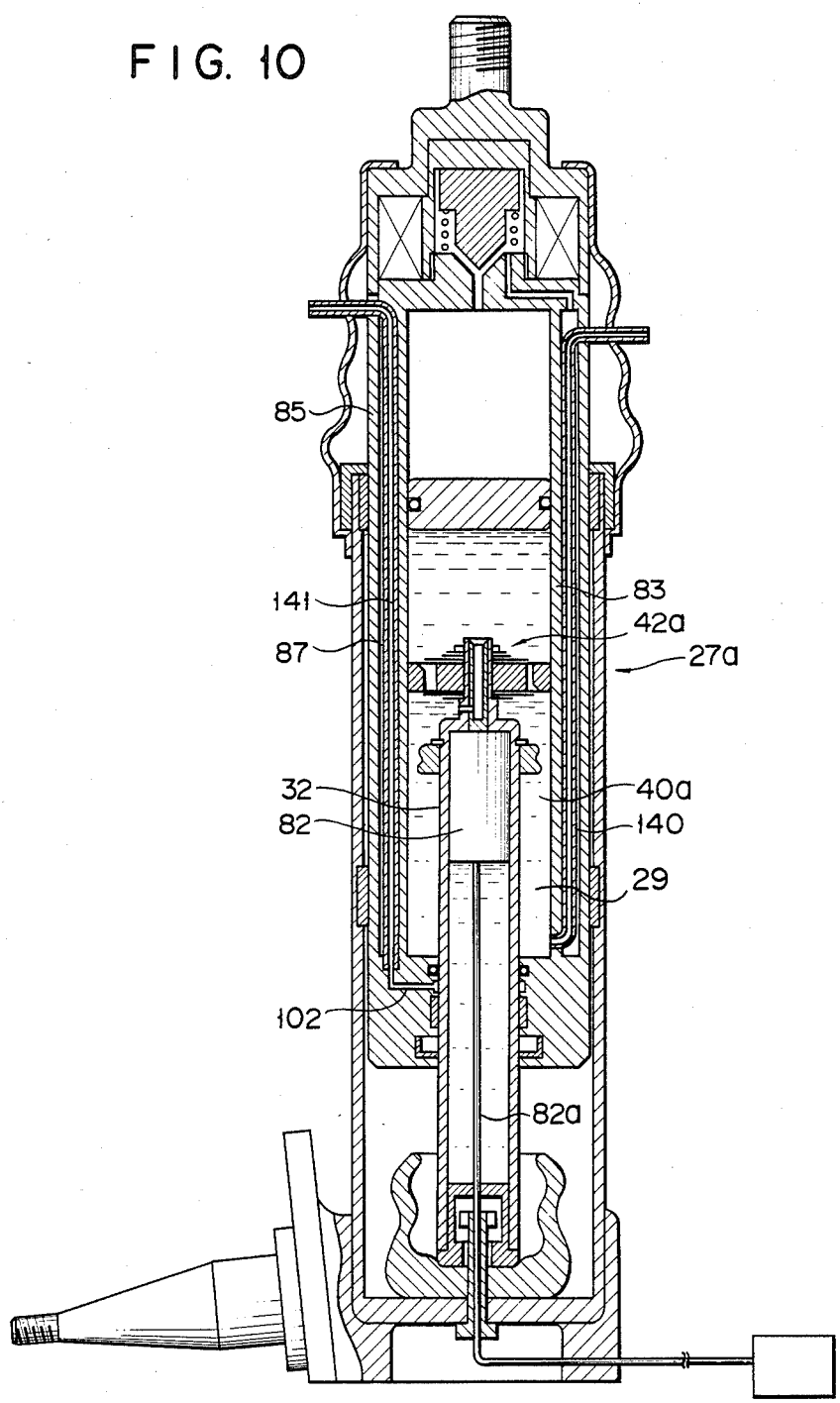
FIG. 10 is a sectional view of a fifth embodiment of a vehicle suspension apparatus of the present invention.

FIG. 10 shows a fifth embodiment of the suspension apparatus according to the present invention. The apparatus of this embodiment is basically the same as that shown in FIG. 8 except in the following respects. More specifically, in this embodiment, in order to change the flow resistance through the orifice of a member 42a, the drive mechanism 120 as shown in FIG. 8 is not used, but a motor 82 arranged in a rod 32, described with reference to FIG. 4, and powered via a wire 82a is used. Piping 140 and 141 are formed to extend downward from the upper end of the cylinder 24a through an annular space 87 between inner and outer cylinders 83 and 85. The piping 140 provides a channel for supplying working oil to an oil chamber 40a inside the inner cylinder 83. The piping 141 provides a communication channel between a drain channel 102 from the oil chamber 40a and the outside of the outer cylinder 85. In this embodiment, since the pipings 140 and 141 extend to the outside from the side closer to the vehicle, a good effect can be obtained as in the case in FIG. 8 as compared to a case wherein the piping extends from the side of the vehicle, as in FIGS. 4 and 5.

Figure 11:
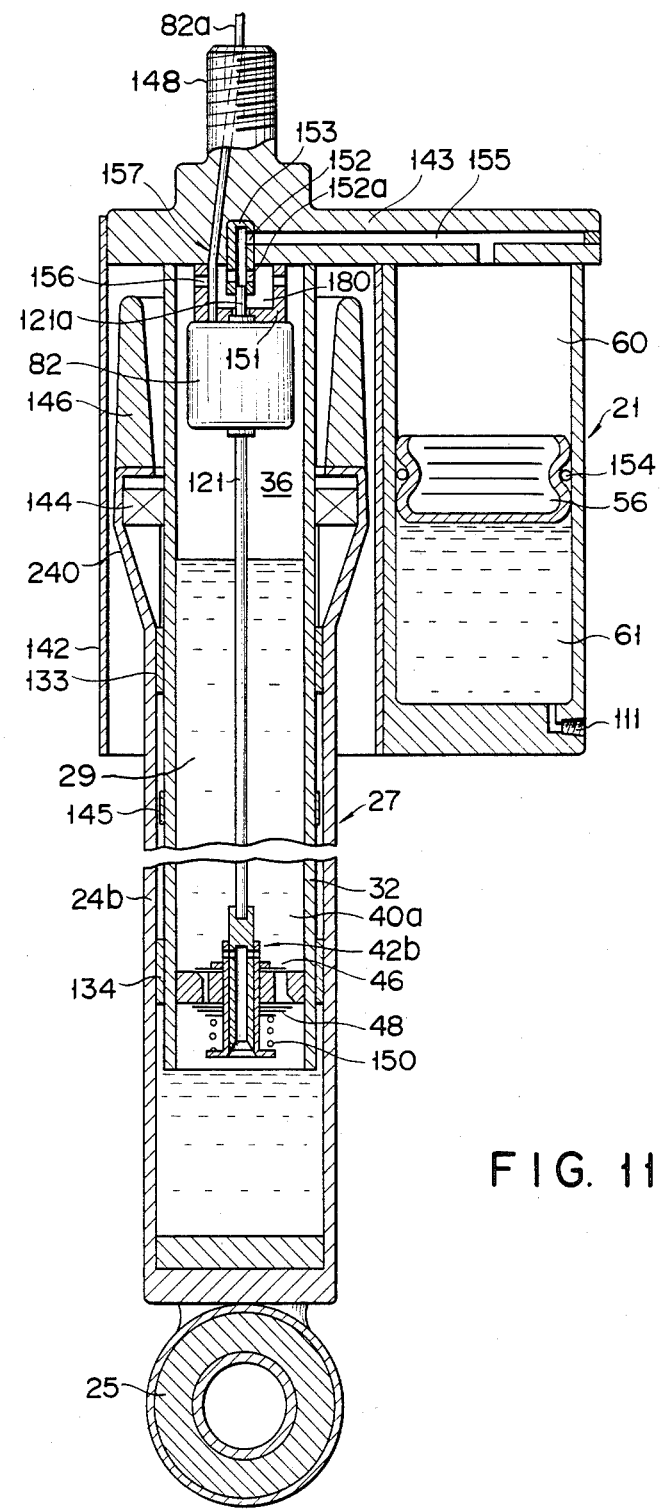
FIG. 11 is a sectional view of a sixth embodiment of a vehicle suspension apparatus of the present invention.

FIG. 11 shows a sixth embodiment of the present invention wherein the arrangement of a cylinder and an auxiliary container is different from those described above with reference to the earlier embodiments. In the apparatus of this embodiment, a cylinder 24b and an auxiliary container 21 are arranged next to each other and have substantially parallel central axes. The cylinder 24b is mounted on a mounting member 25 at the vehicle side to extend upward, and its upper end portion is tapered to increase into a substantially frustoconical portion 24c. A hollow rod 32 is inserted from the upper opening of the cylinder 24b. A cover 142 covers the cylinder 24b and the rod 32. The upper ends of the cover 142 and the rod 32 are at substantially the same level as the upper end level of the auxiliary container 21 arranged next to them, and all these upper ends are closed with a common base 143. The common base 143 has a threaded portion 148 which projects upward for coupling the apparatus to a mounting member (not shown) at the vehicle side.

The rod 32 is supported in the cylinder 24b so as to be vertically movable and rotatable through a seal 144, the two bearings 133 and 134 made of a material, such as polytetrafluorethylene, having a high wear resistance and mounted inside the cylinder 24b, and a stopper 145 mounted around the rod 32. A rubber bumper 146 is arranged at the upper end of the frustoconical portion 24c of the cylinder 24b. When the rod 32 is moved upward relative to the cylinder 24b, the stopper 145 is engaged with the bearing 133 to define its uppermost position. When the rod 32 is moved downward relative to the cylinder 24b, the rubber bumper 146 abuts against the lower surface of the common base 143 to define the lowermost position of the rod 32.

An oil chamber 40a is formed inside the rod 32. A restriction member 42b is mounted inside the oil chamber 40a so as to be immersed in the working oil. The restriction member 42b is driven through a drive shaft 121 by a motor 82 mounted to the lower end of the common base 143. The restriction member 42b of this embodiment is different from that shown in FIG. 3 in that a spring 150 is used to urge valve seats 46 and 48 toward a restriction member main body 43.

The motor 82 is mounted on the lower surface of the common base 143 through a channeled member 151 such that it is arranged inside a gas chamber 36 at the upper portion of the rod 32. A valve member 153 is tightly fitted around a drive shaft 121a projecting upward from the motor 82. The valve member 153 has a cylindrical shape with a closed top and a radial hole 152 formed at its upper end portion. A radial hole 152a is formed in the position of the valve member 153 which is close to but above the drive shaft 121a inserted in the valve member 153. The valve member 153 projects inside the common base 143 and is rotatably supported by driving the motor 82.

Figure 12:
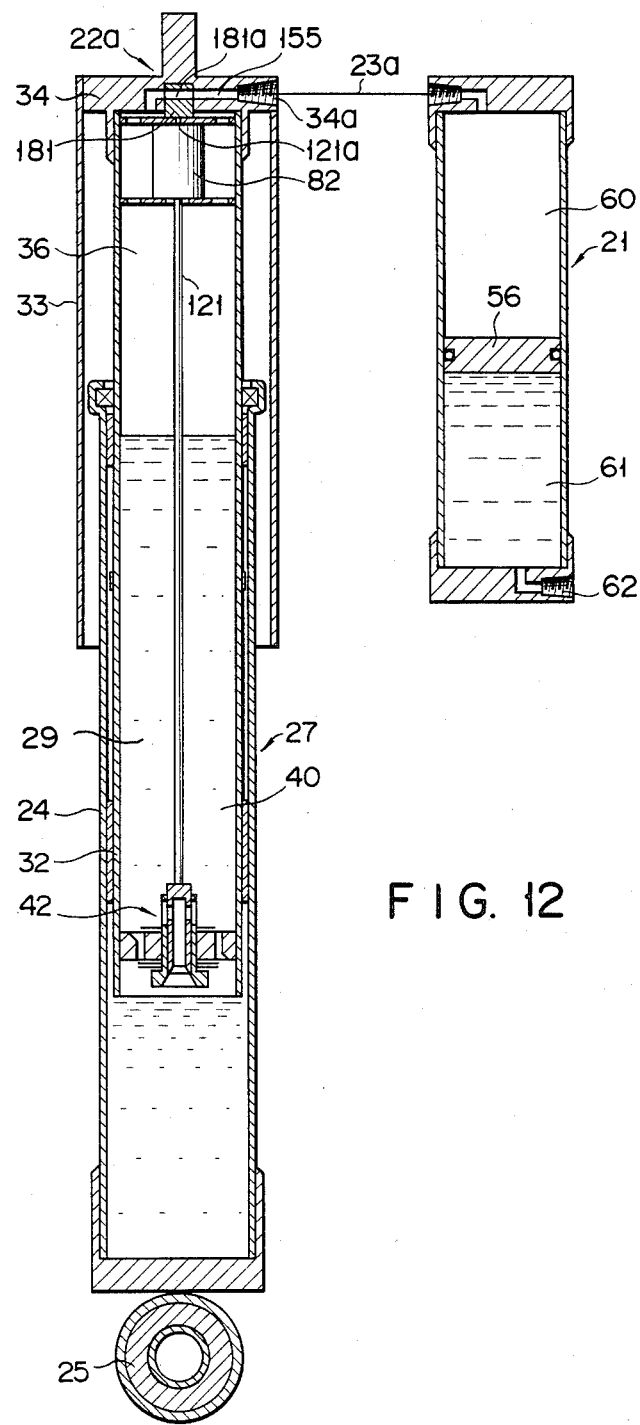
FIG. 12 is a sectional view of a seventh embodiment of a vehicle suspension apparatus of the present invention.

A free piston 56 is inserted inside the auxiliary container 21. A gas chamber 60 is formed above the free piston 56, and a hydraulic chamber 61 is formed therebelow. A sealing member 154 is fitted around the free piston 56. A port 111 is arranged at the lower end of the oil chamber 61 and can be coupled to an external hydraulic unit (reference numeral 70 in FIG. 1). The gas chamber 60 is connected to the valve member 153 through a control channel 155. FIG. 12 shows a case wherein the radial hole 152 and the control channel 155 of the valve member 153 are communicated with each other by means of the motor 82. In this condition, the gas chamber 36 inside the rod 32 is coupled to the gas chamber 60 of the auxiliary chamber 21 through a hole 156 formed in the leg portion of the channeled member 151, the hole 152a formed in the valve member 153, an internal space 180 inside the valve member 153, and the radial hole 152 formed in the valve member 153. Then, a low spring constant of the suspension apparatus is obtained. When the valve member 153 is rotated by the motor 82 through about 90 degrees from the position shown in FIG. 11, a connection between the radial hole 152 of the valve member 153 and the control channel 155 is blocked. Since the spring constant of the suspension apparatus is determined in accordance with the volume of the gas chamber 36 of the rod 32, the spring constant is increased in this case. As described above, the valve member 153 serves as a valve 157 for opening/closing the control channel 155.

Coupling of the valve member 153 and the restriction member 42b to the motor 82 is set such that the orifice of the restriction member 42b is enlarged when the control channel 155 is opened and is reduced when the control channel 155 is closed. In the apparatus of this embodiment shown in FIG. 11, since external piping is not used for the control channel 155, similar effects to those of the embodiment shown in FIG. 4 can be obtained; including prevention of the problem of gas leakage, a high resistance to vibration, and no adverse effect against an external force of high frequency.

In this suspension apparatus, as in the earlier apparatuses described above, vehicle height adjustment and automatic control using various sensors and the controller can be performed. However, since the operation mode for this is the same as that described above, a description thereof will be omitted.

The suspension apparatus having the above-mentioned construction has still other advantages as compared to a conventional strut suspension apparatus wherein a coil spring is arranged around a shock absorber. In such a conventional strut suspension apparatus, when the vehicle turns, a strut outercylinder and a coil spring must also turn in the same turning direction as the vehicle. For this purpose, a thrust bearing must be interposed between a strut and a mounting insulator, resulting in a complex construction. Furthermore, since the coil spring and the spring seat are arranged around the rotating shaft, the inertia moment of rotation is increased. At the same time, since the damping force of a thrust bearing is small, unstable rotation occurs, and stable high speed driving cannot be achieved.

In contrast to this, in this embodiment of the present invention, the coil spring, the spring washer, and the thrust bearing required in a conventional strut suspension apparatus are not required. Therefore, the suspension apparatus can be rendered compact in size. Furthermore, since the rod is hollow and can therefore have a large outer diameter, it has a high bending stiffness. Since the hollow rod is normally in contact with the working oil as it is inserted in the cylinder, it can provide a suitable damping force to the relative rotation of the cylinder and improve driving stability.

In a seventh embodiment shown in FIG. 12, when a cylinder and an auxiliary container cannot be arranged in tight contact with each other due to the space condition, the auxiliary container is arranged at a distance from the cylinder and is connected thereto through a pipe. However, the arrangement shown in FIG. 12 is different from that shown in FIG. 11 in that a valve for communicating the two gas chambers is formed in a cover 34 at the upper portion of the cylinder, so that the apparatus resists impact and allows easy mounting as compared to an arrangement wherein the valve is arranged at a postion intermediate along the piping. Reference numerals used in FIG. 12 are the same used for the earlier embodiments. The structures and functions of the parts designated by these reference numerals are apparent from the description of the earlier embodiments, and will only be briefly described, except for some special parts.

A cylinder 24 is mounted on a mounting member 25 and receives a hollow rod 32 inserted therein from above. The upper end of the rod 32 is closed by the cover 34, and a protection cover 33 extends downward from the periphery of the cover 34. An oil chamber 40 for holding hydraulic fluid is formed at the lower portions of the cylinder 24 and the rod 32 and has substantially the same structure as that shown in FIG. 11. A restriction member 42 is mounted to a portion of the inner wall of the rod 32, which is immersed in the working oil of the oil chamber 40. A motor 82 is mounted in a gas chamber 36 formed at the upper portion of the rod 32. The motor 82 drives the restriction member 42 through a drive shaft 121a and extends upward. The motor 82 also drives a valve 22a formed in the cover 34 through another drive shaft 121a. The valve 22a opens/closes a communication channel between a gas chamber 36 inside the rod 32 and a port 34a of the cover 34 to which piping 23a, connected to a gas chamber 60 at the upper portion of the auxiliary container, is connected.

In the valve 22a, a valve member 181 is rotated by the drive shaft 121a extending upward from the motor 82. The valve member 181 has a radial through hole 181a. The cover 34 has a control channel 155 which communicates the gas chamber 36 and the port 34a opening with the outer surface of the cover 34. When the valve member 181 is brought to a predetermined position by the motor 82 and the through hole 181a is communicated with the control channel 155, the gas chamber 60 in the auxiliary container 21 and the gas chamber 36 inside the rod 32 are communicated with each other. When the valve member 181 is rotated through about 90 degrees from the position shown in FIG. 12 and communication between the through hole 181a and the control channel 155 is shielded, communication between the gas chambers 36 and 60 is also shielded.

An oil chamber 61 is formed inside the auxiliary container 21. A free piston 56 is inserted between the hydraulic chamber 61 and the gas chamber 60. These members are used for vehicle height adjustment as described above. Therefore, if vehicle height adjustment is not required, these members can be omitted.

Figure 13:
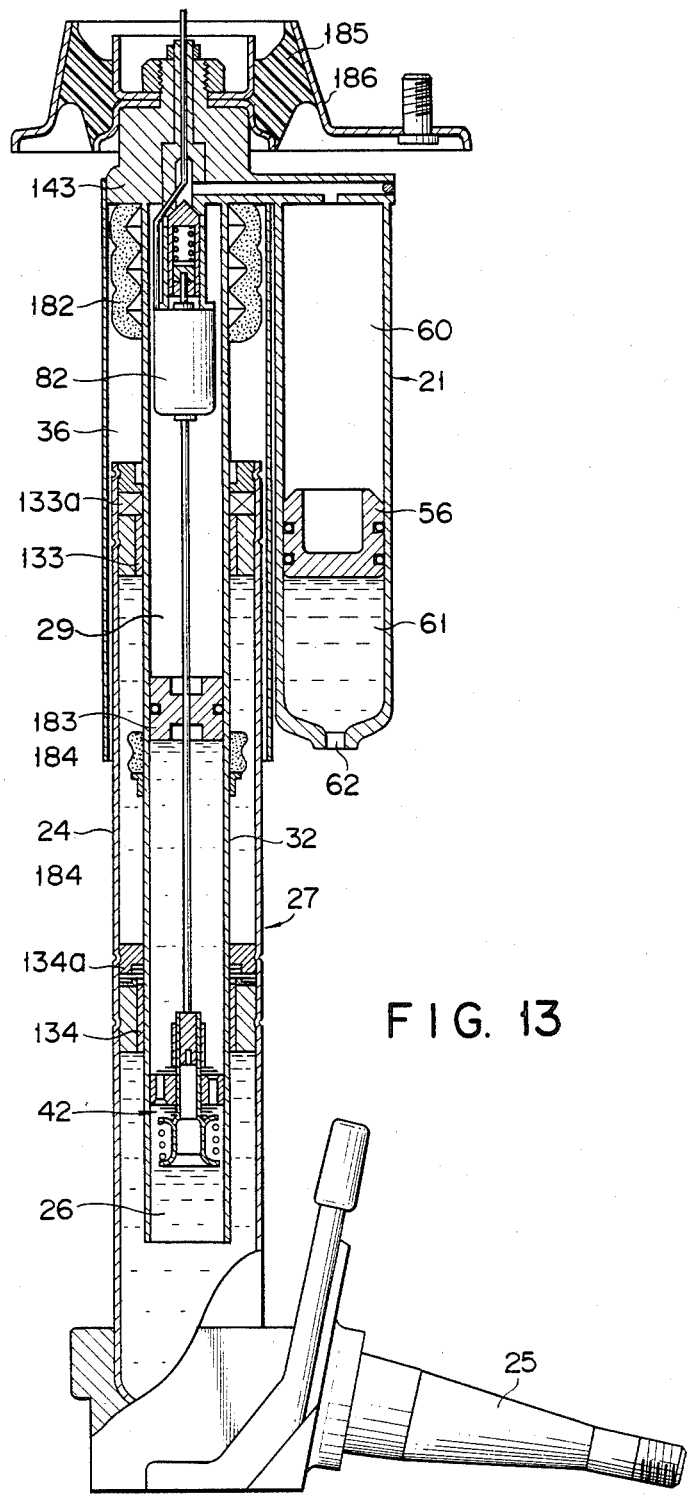
FIGS. 13 and 14 are respectively sectional views of eighth and ninth embodiments of a vehicle suspension apparatus of the present invention.

FIG. 13 shows an eighth embodiment similar to the embodiment shown in FIG. 11. The embodiment shown in FIG. 13 is different from that shown in FIG. 11 in that sealing members are arranged for bearings 133 and 134, respectively. As shown in FIG. 13, the two bearings 133 and 134 are arranged between the cylinder 24 and the rod 32, a sealing member 133a is arranged immediately above the upper bearing 133, and a sealing member 134a is arranged immediately above the lower bearing 134. Since the sealing members 133a and 134a are arranged in this manner, when the rod 32 is moved vertically, relative to the cylinder 24, working oil cannot leak outside the cylinder 24 together with the rod 32. Foreign matter such as dust cannot be introduced into the working oil between the sealing members 133a and 134a or into a lower oil chamber 26 through the sealing member 134a, and so does not damage the outer surface of the rod 32 when passing through the sealing members 133a and 134a.

Reference numeral 182 denotes a rubber bumper which is mounted on the lower surface of the common base 143 and defines the lowermost position of the rod 32. Reference numeral 183 denotes a free piston inserted in the rod 32; and 184, a rebound rubber stopper mounted around the rod 32. When the rod 32 is moved upward, the rubber stopper 184 is engaged with the bearing 133 to define the uppermost position of the rod 32. The common base 143 mounted at the upper portion of the cylinder 24 is mounted on a mount insulator 185 which is, in turn, mounted on a mounting portion 186 at the side of the vehicle.

Figure 14:
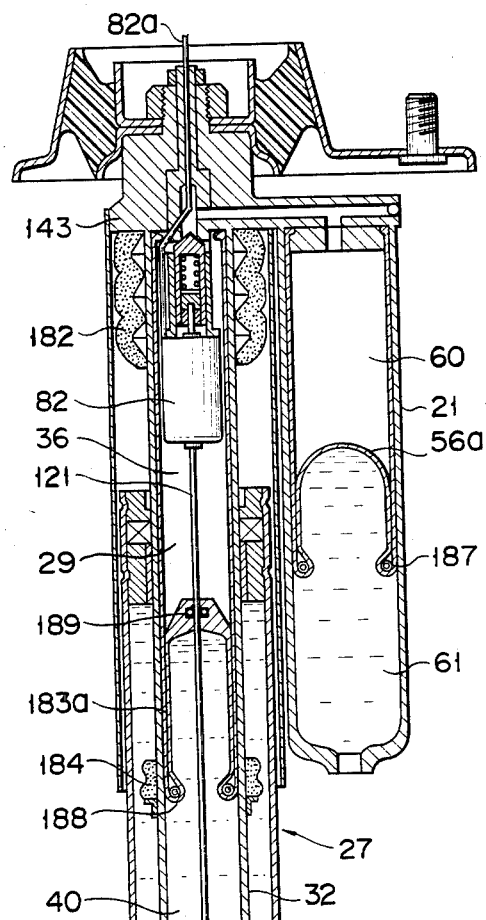
Figure 14:
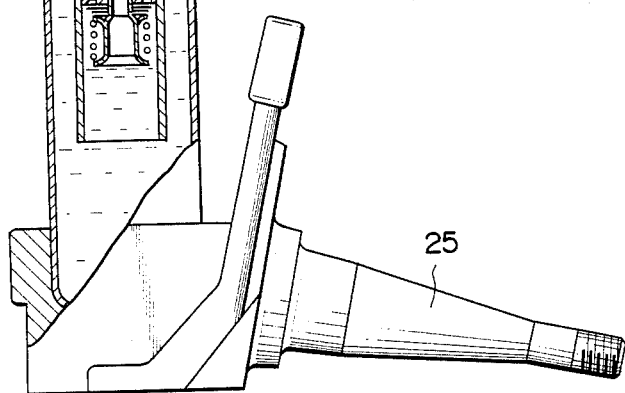

FIG. 14 shows a ninth embodiment which is substantially the same as that shown in FIG. 13.

In this embodiment, an urethane elastomer film 56a is interposed between a gas chamber 60 and a hydraulic chamber 61 in place of the free piston so as to separate working oil from gas. In order to allow the urethane elastomer film 56a to contract and expand, a rotational movement guide 187 is wrapped in a held portion of the film 56a. A rotational movement guide 188 is mounted on an urethane elastomer film 183a so as to separate a gas chamber 36 and an oil chamber 40 in the rod 32. A sealing member 189 slidably and rotatably provides a seal between the drive shaft 121 and the urethane elastomer film 183a. Separation between a gas chamber and an oil chamber through an urethane elastomer film can be performed only in the auxiliary container 21 or in the rod 32.

In the apparatus of the embodiment shown in FIG. 14, attachment of dust or the like to a sealing portion between a cylinder and a rod can be prevented. Oil or gas leakage through the sealing portion can also be prevented, thus providing a highly reliable vehicle suspension apparatus.

What is claimed is:

1. A vehicle suspension apparatus comprising a contraction/expansion body including a cylinder and a hollow rod telescopically coupled to the cylinder in a substantially coaxial relation so as to reciprocate therewith and having therein an internal space of variable volume, the internal space being separated into a gas chamber filled with a gas and an oil chamber filled with a working oil;

A restriction member submerged in said working oil and arranged in the oil chamber to be substantially perpendicular to an axis of the contraction/expansion body and having an orifice to allow passage therethrough of the working oil;

an auxiliary container having a gas chamber containing gas therein and an oil chamber containing oil therein;

a channel for coupling through a valve the gas chamber of the internal space of the rod and the gas chamber of the auxiliary container;

a hydraulic pump means for increasing/decreasing the quantity of oil contained in the auxiliary container and commensurately decreasing/increasing the quantity of gas contained in the gas chamber of said auxilary container; and means operable in response to travel conditions encountered during movement of the vehicle for controlling, during actual vehicle use, an area of the orifice arranged in said restriction member in order to vary damping; for controlling the operation of the valve to set the amount of gas passing therethrough in order to control springiness, and to control said hydraulic pump means by increasing-/decreasing the amount of oil contained in the oil chamber of said auxiliary container to set height of the body by varying the volume of the gas chamber in said rod with a commensurate variation of the volume in the gas chamber of said auxilary container.

2. An apparatus accordign to claim 1, wherein said auxiliary container is arranged separate from said cylinder and said rod having said inernal space, and said channel comprises piping for coupling said gas chamber in said auxiliary container and said gas chamber formed in said contraction/expansion body.

3. An apparatus according to claim 1, wherein said cylinder has a double structure consisting of an inner cylinder and an outer cylinder, an annular space defined between said inner and outer cylinders constituting said gas chamber of said auxiliary container, and said annular space and said gas chamber of said internal space are coupled through said channel which is formed in an upper wall closing an upper end of said contraction/expansion body and through said valve in the form of a solenoid operated valve.

4. An apparatus according to claim 1, wherein said auxiliary container is arranged next to said contraction-/expansion body to have an axis substantially parallel to an axis thereof, and said gas chamber in said internal space and said gas chamber of said auxiliary container are communicated through said valve and said channel which are arranged in a common base for closing said contraction/expansion body and said auxiliary container.

5. An apparatus according to claim 1, wherein said operable means includes means for automatically maintaining the volume of the gas chamber in the rod, and therefore the height of the body, substantially constant in spite of variations in load applied to the vehicle.

6. An apparatus asccording to claim 1, wherein said operable means maintains said valve open during adjustments in body height.

* * * * *